United States Patent

Oba et al.

[11] Patent Number: 6,049,852
[45] Date of Patent: Apr. 11, 2000

[54] PRESERVING CACHE CONSISTENCY IN A COMPUTER SYSTEM HAVING A PLURALITY OF MEMORIES WITH OVERLAPPING ADDRESS RANGES

[75] Inventors: Nobuyuki Oba, Sendai; Ikuo Sho, Moriyama; Takeo Nakada, Kawaguchi, all of Japan

[73] Assignee: International Business Machines Corporation, Armonk, N.Y.

[21] Appl. No.: 08/529,298

[22] Filed: Sep. 15, 1995

[30] Foreign Application Priority Data

Sep. 16, 1994 [JP] Japan .................................. 6-221614

[51] Int. Cl.$^7$ ...................................... G06F 12/00
[52] U.S. Cl. ................... 711/145; 711/156; 711/3; 711/202; 711/209
[58] Field of Search ...................... 395/471, 472, 395/483, 468; 711/144, 145, 156, 141, 3, 202, 209

[56] References Cited

U.S. PATENT DOCUMENTS

| | | | |
|---|---|---|---|
| 4,158,227 | 6/1979 | Baxter et al. ............................ | 711/209 |
| 4,484,267 | 11/1984 | Fletcher .................................... | 395/451 |
| 4,885,680 | 12/1989 | Anthony et al. ......................... | 395/471 |
| 5,038,278 | 8/1991 | Stelly, Jr. et al. ....................... | 711/133 |
| 5,155,826 | 10/1992 | Fadem .................................... | 711/209 |
| 5,265,232 | 11/1993 | Gannon .................................. | 711/124 |
| 5,276,888 | 1/1994 | Kardach et al. ......................... | 395/734 |
| 5,339,437 | 8/1994 | Yuen ...................................... | 710/261 |
| 5,357,628 | 10/1994 | Yuen ........................................ | 714/34 |
| 5,475,829 | 12/1995 | Thome ................................... | 711/152 |
| 5,491,806 | 2/1996 | Horstmann et al. ..................... | 711/207 |
| 5,509,139 | 4/1996 | Ayash et al. ............................ | 395/869 |
| 5,544,344 | 8/1996 | Frame ...................................... | 395/471 |
| 5,574,877 | 11/1996 | Dixit et al. ............................... | 711/207 |
| 5,577,221 | 11/1996 | Liu et al. ................................. | 711/100 |
| 5,579,503 | 11/1996 | Osborne ................................. | 711/119 |
| 5,603,011 | 2/1997 | Piazza ...................................... | 711/170 |
| 5,630,147 | 5/1997 | Datta et al. ............................. | 713/300 |
| 5,636,363 | 6/1997 | Bourekas et al. ....................... | 711/138 |
| 5,638,532 | 6/1997 | Frame et al. ............................ | 711/154 |
| 5,668,968 | 9/1997 | Wu .......................................... | 711/3 |
| 5,675,763 | 10/1997 | Mogul .................................... | 711/135 |
| 5,745,770 | 4/1998 | Thangadurai et al. .................. | 710/260 |

OTHER PUBLICATIONS

John Goodman, "Memory Management for all of us," Deluxe Edition Sams Publishing, Div of Prentice Hall Computer Pub, First Edition, pp. 239–254, pp. 670–675 and Reference Card (2 pages), 1993.

Primary Examiner—Eddie P. Chan
Assistant Examiner—Hong Kim
Attorney, Agent, or Firm—Martin J. McKinley

[57] ABSTRACT

A means for preserve cache consistency is provided for a system comprising a central processing unit, a first physical memory, a second physical memory for which the address is common to the first physical memory in at least some duplicated address range of the entire physical address, a cache memory, and a memory controller, wherein the first or second physical memory is selected depending on the operation mode. Flag bits are provided in a tag memory of the cache for information identifying the data source. The cache then does not determine a cache hit/miss only based on whether data related to a CPU requested address exists in the cache, but determines whether the source of data requested by the CPU is consistent with the source of data stored in the cache by taking into account information on the operation mode simultaneously sent from the CPU. A cache hit is determined only when such two conditions are met.

1 Claim, 3 Drawing Sheets

PRESERVING CACHE CONSISTENCY IN A COMPUTER SYSTEM HAVING A PLURALITY OF MEMORIES WITH OVERLAPPING ADDRESS RANGES

BACKGROUND OF THE INVENTION

Applicants claim the foreign priority benefits under 35 U.S.C. 119 of Japanese Application No. 6-221614 filed in Japan on Sep. 16, 1994. This Japanese Application and its translation are incorporated by reference into this Application.

This invention pertains to cache memories and, more particularly, to a means for preserving cache consistency when a CPU accesses a plurality of physical memories having different memory architectures.

Computer systems have recently emerged which enable operation in a mode different from a standard operation mode. In such a system, the CPU switches the system operation from the standard mode to the special mode. The special mode is mainly used to reduce power consumption in a personal computer. A block diagram of a computer system is shown in FIG. 5. This system is employed in small computer systems such as personal computers, and comprises a CPU, a cache, a memory, and a memory controller. The difference from the standard personal computer system lies in that the memory is physically divided into a standard memory and a system management memory or "SMRAM".

The CPU employing the special mode as described above switches its operation mode from the standard mode to the special mode when it receives a system management interrupt. Such a switched special mode is called the system management mode ("SMM").

When the CPU operates in the system management mode, it uses a special physical memory architecture called SMRAM which differs from the memory architecture used in the standard mode. This memory stores SMM handler codes, system-specific SMM data, and information representing the status of the CPU.

Referring to FIG. 1, the CPU 1 uses the standard memory 10 in the standard mode. However, for a certain address range (for example, 30000–3FFFF) the SMRAM 12 used in the system management mode is mapped in an overlapped fashion. In this specification, this physical address region is called an SMM region 3 herein to distinguish from other non-SMM regions 5.

When the CPU switches the system operation mode from the standard mode to the system management mode, it holds an SMIACT# line low. This causes the memory controller 16 to switch to the system management mode in order to switch from the standard memory to the SMRAM. The SMIACT# line is shown, for example, in FIG. 4. The CPU then stores the current register status information from the first address of the SMRAM in a manner similar to a stack. This is called a status save. When the status save processing is completed, the SMI handler starts execution.

A cache 14 is situated between the memory controller and the CPU to increase access speed. The cache 14 covers such overlapped and mapped SMM regions also, as with other regions. Therefore, when the SMM region is accessed, the cache has two possible statuses, one containing data related to the standard mode stored from the standard memory, and the other containing data related to the system management mode stored from the SMRAM.

Because the possibility exists that the cache 14 has data stored from two types of memory on a cache line related to the same physical address, there may arise a problem when the CPU accesses the cache memory after when it switches mode, for example, from the standard mode to the system management mode. In this case, if a cache line related to the physical address requested by the CPU exists in the cache, a cache hit occurs and the data is sent to the main memory. However, the data stored in the cache is that stored from the standard memory, which differs from the data stored from the SMRAM related to the same physical address requested by the CPU. Therefore, if the data is sent to the main memory based on only the fact that the cache has received a cache hit, the data actually requested by the CPU fails to match the data being sent.

In other words, this problem has been caused by the fact that the data in the cache memory is not always read from the SMRAM. Such a problem is called a cache inconsistency.

In a system employing a method to perform an operation with different physical memory whenever the mode is switched, many attempts have been taken to prevent such cache inconsistencies. One of these methods is to flush the cache each time the CPU switches its mode. According to this method, because all data stored in the cache is erased each time the operation mode is changed, the above-mentioned cache inconsistency problem does not arise. The cache flush itself, however, has the following problems:

First, the cache flush equally erases all data in the cache. That is, even valid (consistent) data present in the cache becomes subject to being flushed. This is an ineffective operation. Furthermore, data must be restored to the cache from a "cold start" where the contents of the cache is built from scratch, which requires considerable time.

Second, the time taken by the cache flush itself becomes a problem. This cache flush operation returns cache data by checking all cache lines for whether or not there is data on each cache line. Performing such an operation consumes a considerable amount of time similar to filling the cache from the cold start described above.

Cache sizes have continued to increase, a trend which directly affects in the time required for the cache flush itself. It can therefore be understood that the conventional method of flushing the cache each time the CPU switches modes is becoming impractical.

SUMMARY OF THE INVENTION

The object of this invention is to provide an efficient method which avoids cache flushing but which preserves the cache consistency when the CPU switches its operation mode.

A system to which the present invention is applied is a system shown in FIG. 1, which comprises a central processing unit, a first physical memory, a second physical memory for which the address is common to the first physical memory in at least some duplicated address range, a cache memory associated with the central processing unit and the physical memories covering at least a portion of the duplicated address range, and a memory controller for controlling access from the cache memory to the physical memories. Here, the central processing unit accesses the first physical or standard memory in the first or standard mode, and the second physical memory or SMRAM in the second or system management mode.

The cache consistency problem can be resolved by placing information in the cache memory for identifying the data source stored in its cache lines, and determining cache hit/miss using this information.

To this end, flag bits are provided in a tag memory of the cache to identify the data source. The cache then does not determine a cache hit/miss only based on whether data related to a CPU-requested address exists in the cache, but determines whether the source of the data requested by the CPU is consistent with the source of data stored in the cache by taking into account information on the operation mode simultaneously sent from the CPU. A cache hit is determined only when such two conditions are met.

To perform such an operation, the central processing unit also outputs information for identifying the operation mode in which the system is currently operating in addition to a physical address related to an access request.

DESCRIPTION OF THE ILLUSTRATIVE EMBODIMENTS

Figure 2:
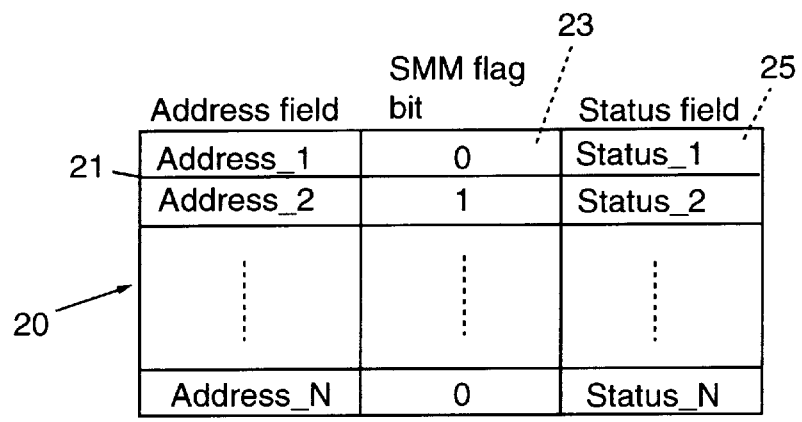
FIG. 2 is a diagram of the configuration of a cache tag memory containing SMM flag bits.
Figure 3:
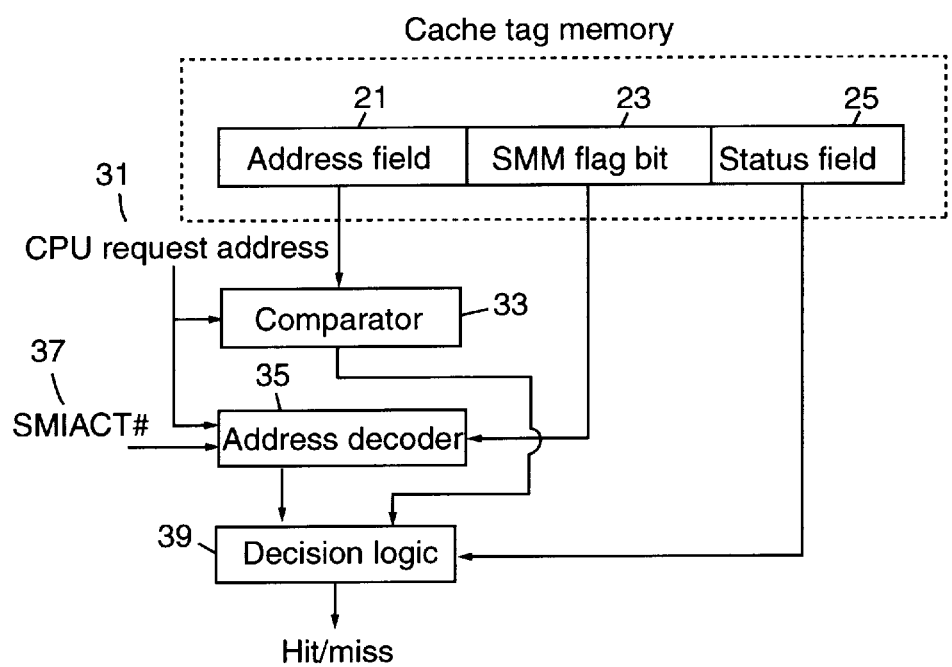
FIG. 3 is a block diagram of a system for determining cache hits and misses.

In a first embodiment of the present invention, a 1-bit flag bit is provided in the cache memory for identifying the mode. This bit is called an SMM flag bit. FIG. 2 shows an example of a configuration of a cache memory 20 provided with an SMM flag bit. Although the following description is made by using physical addresses for convenience, the present invention can be also implemented by using logical addresses.

An address field 21 indicates the physical addresses of data stored. The SMM flag bit 23 is a bit for identifying whether the stored data is copied from the standard memory or from the SMRAM. A status field 25 consists of a plurality of flags. The plurality of flags is to indicate, for example, whether the data is valid or invalid, or whether the data is dirty (meaning that the data in the cache differs from that stored in the standard memory or the SMRAM).

This example indicates, on the one hand, that data at the address 1 and address N are copied from the standard memory because the SMM flag bit is 0. On the other hand, data at the address 2 is data copied from the SMRAM because the SMM flag is 1.

The SMM flag bit is set or reset when data is read from any of the physical memories. This is usually a case in which a cache miss is determined. If the system is in the standard mode when the data is read from any of the physical memories, the SMM flag bit is set to 0. If the system is in the system management mode, the SMM flag bit is set to 1. Monitoring of the system mode can be made by monitoring, for example, an SMIACT# line connected to the cache. The relationships are listed in detail in Table 1 by dividing them into cases where the physical address obtained as the result of output from an address decoder is in the SMM region, and cases where it is in a non-SMM region.

TABLE 1

| SMIACT# | Address decoder output | SMM flag bit |
|---------|------------------------|--------------|
| 1       | —                      | 0            |
| 0       | SMM region             | 1            |
| 0       | Non-SMM region         | 0            |

("—" Indicates no relationship)

Figure 1:
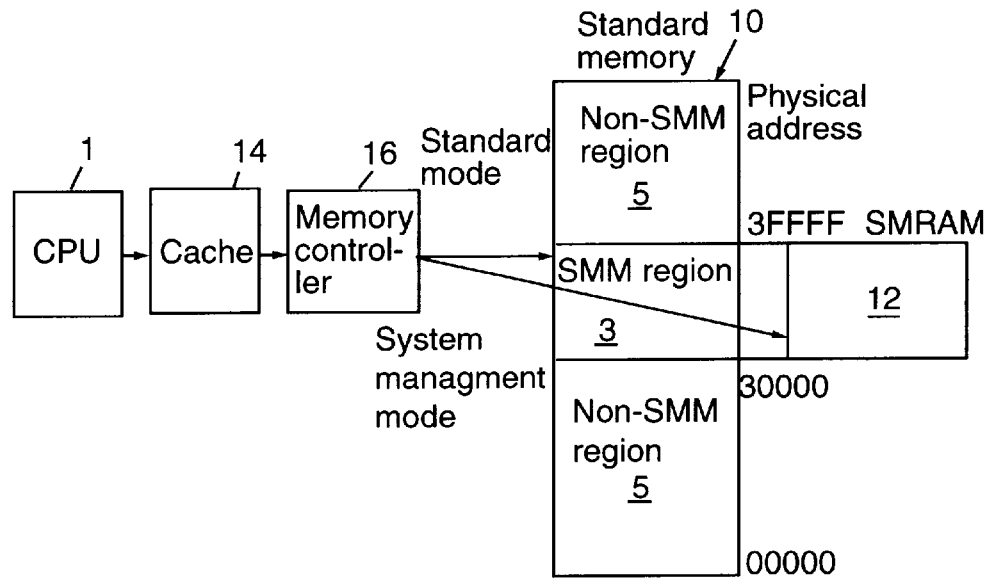
FIG. 1 is computer system having standard and system management memories.

When SMIACT# is 1 (high), on the one hand, the CPU specifies the standard mode. In this case, even if the address decoder output indicates any physical address, the data is read from the standard memory. Therefore, the SMM flag bit is set to 0. When the SMIACT# is 0 (low), on the other hand, the CPU specifies the system management mode. In this case, on the other hand, the setting of the SMM flag bit depends on whether the physical address obtained as the result of address decoding is in the SMM region or in the non-SMM region. When the address decoder output indicates the SMM region, the data is read from the SMRAM to the cache memory so that the SMM flag bit is set to 1. On the other hand, when the address decoder output indicates the non-SMM region, the data is not read from the SMRAM to the cache memory because, as shown in FIG. 1, the SMRAM is not mapped in the non-SMM region. Data is then read to the cache memory from the standard memory, and the SMM flag is set to 0.

The embodiment refers to two types of operation modes, the standard mode and the system management mode. However, there may be a possibility, for example, that the operation is performed in more types of mode. In such a case, it is sufficient to increase the number of SMIACT# signal lines according to the number of types of mode, and the number of corresponding SMM flag bits. If there are three types of mode, two lines and two bits will be necessary for the SMIACT# signal lines and the SMM flag bits, respectively, for identifying the current operation mode. However, such a modification is simply a modification of the embodiment of the present invention, and the basic concept is included in the scope of the disclosure of the present invention.

An address 31 from the CPU is compared to the address field 21 in the cache by a comparator 33. At the same time, the CPU address 31 is supplied to an address decoder 35. The address decoder is also simultaneously supplied with an SMIACT# signal 37 and an SMM flag bit 23. The address decoder determines whether an address requested by the CPU is in the SMM region or the non-SMM region through identification by the decoding of it. Then, the address decoder determines whether the access should go to the standard memory or the SMRAM by referring to SMIACT#. That is, it can be determined that the SMRAM should be accessed when SMIACT# is low (system management mode), and the CPU requests the SMM region for access. Otherwise, the access goes to the standard memory.

First, the comparator 33 compares the address 31 requested by the CPU with the address field 21 in the cache tag memory. As a result of this comparison, if the address fails to match, a cache miss is determined. When the address matches, the address decoder 35 further compares the state of SMIACT# 37 with the SMM flag bit 23 in the cache tag memory.

Thereafter, this information is determined in a decision logic circuit 39. Here, it should be noted that, because operation is being performed in the system management mode when SMIACT# is low (0), the current operation mode matches the physical memory in h the data in the cache is stored when the SMM flag bit is 1.

The decision logic circuit 39 is also supplied with information from the status field 25. The status field stores information, for example, for determining whether data is valid or invalid. In this case, if it is indicated that the information in the status field is invalid, a cache hit is not determined even if other conditions are met.

Details of the comparison decision logic performed by the decision logic circuit 39 are listed in Table 2.

TABLE 2

| # | SMIACT# | SMM flag | Address comparator | Address decoder output | Hit/miss |
|---|---------|----------|--------------------|-----------------------|----------|
| 1 | 1 | 1 | — | — | Miss |
| 2 | 1 | 0 | = | — | Hit |
| 3 | 1 | 0 | ≠ | — | Miss |
| 4 | 0 | 1 | = | — | Hit |
| 5 | 0 | 1 | ≠ | — | Miss |
| 6 | 0 | 0 | = | SMM region | Miss |
| 7 | 0 | 0 | = | Non-SMM region | Hit |
| 8 | 0 | 0 | ≠ | — | Miss |

("—" Indicates no relationship)

For example, on the one hand, in cases #1–#3, SMIACT#=1, that is, the operation is in the standard mode. In case #1, SMM flag bit=1, and it is found that the cache contains data from the SMRAM. On the other hand, because data requested by the CPU is that from the standard memory, the data in this cache line is not the ones requested by the CPU regardless of address coincidence. Therefore, the data should not be read from the cache memory, and it is determined that a cache miss has occurred regardless of the address comparator and the output of the address decoder. Next, in cases #2 and #3, the SMM flag is 0, and the cache line stores data from the standard memory. Therefore, when the address comparator determines that case to be "coincident," it is permitted to determine a cache hit in case #2, and a cache miss should be determined for a decision of "not coincident," i.e., case #3.

In addition, in cases #4–#8, SMIACT#=0, that is, the operation is in the system management mode. In this case, since the data in the cache is that read from the SMRAM if the SMM flag bit is 1, it may be permitted to determine a cache hit when the address comparator determines "coincident," i.e., case #4. If the address comparator determines data to be "not coincident," it means a cache miss, i.e., case #5. If SMM flag=0, that is, if date in the cache is that read from a memory in the standard mode, the address decoder further determines whether it is an SMM region, thereby changing the decision on cache hit/miss.

First, if the output of address comparator is "not coincident," it will be obvious that it is determined to be a cache miss without any problem, i.e., case #8. There arises a problem in a case where the output of address comparator determines data to be "coincident." In this case, in the non-SMM region, the CPU requests data from the standard memory regardless of the current operation mode, and the data stored in the cache line is also that read from the standard memory. In the non-SMM region, the data is uniquely determined, as shown in FIG. 1, once the physical address is determined. Because data cannot be read from the SMRAM, on the one hand, the data stored in the cache is supplied from a memory related to the standard mode even if the current operation mode is the system management mode. Therefore, there arises no problem of cache inconsistency even if a cache hit is determined with the "coincident" output of the address comparator (case #7). On the other hand, in the SMM region, it is determined through the SMM flag bit=0 that the data stored in the cache line is that read from the standard memory. Therefore, the data cannot be used under the system management mode. It should be determined, then, to be cache miss (case #6).

A second illustrative embodiment will now be described. In the embodiment 1, the address decoder is incorporated into the cache memory, but this, however, is not essential. The cache memory has a function to identify the current operation mode from SMIACT#, to determine the SMM and non-SMM regions by address decoding, and to determine whether an access request from the CPU is to a memory related to the standard mode or the SMRAM. It is possible to assign this function to a section of the memory controller supporting the system management mode. That is, it is possible to execute a similar function by utilizing an address decoder provided in the memory controller.

Figure 4:
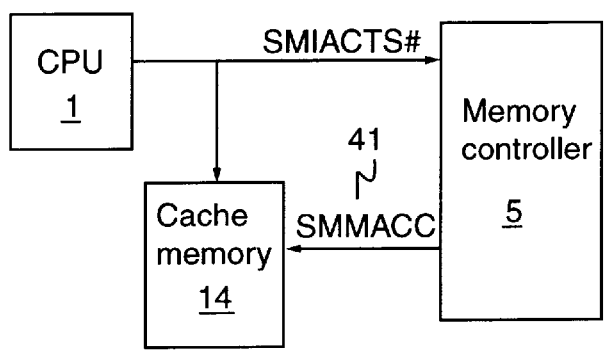
FIG. 4 is a block diagram of a computer system having an SMMACC signal line as described in the second illustrative embodiment of the present invention.
Figure 5:
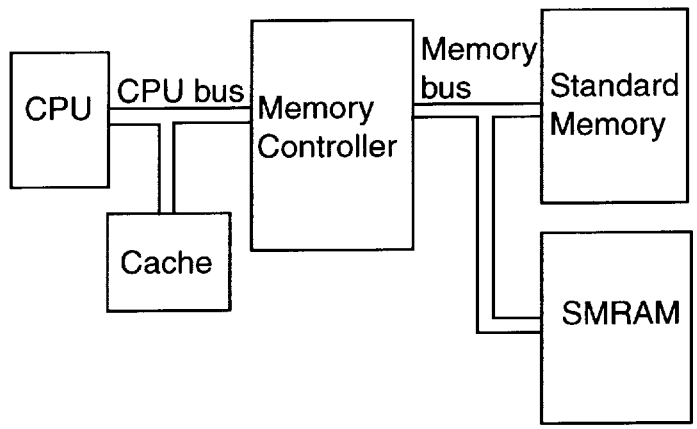
FIG. 5 is a schematic diagram of a typical personal computer system to which the present invention is applied.

FIG. 4 shows an example of system configuration in this case. When the memory controller receives an SMIACT# signal from the CPU, it determines whether the requested address is in the SMM region or the non-SMM region by decoding such address. Then, when the current operation is being performed in the system management mode (that is, the SMIACT# signal is low), and the result of address conversion indicates the requested address in the SMM region, the memory controller makes the SMMACC signal high to access the SMRAM. Otherwise, the memory controller preserves the SMMACC signal at low to access the standard memory. The cache memory 14 can then determine a cache hit/miss by utilizing a logic similar to that shown in Table 2 by monitoring the SMMACC signal.

Detail of comparison decision logic in this case are listed in Table 3.

TABLE 3

| # | SMIACT# | SMM flag | Address comparator | SMMACC | Hit/miss |
|---|---------|----------|--------------------|--------|----------|
| 1 | 1 | 1 | — | — | Miss |
| 2 | 1 | 0 | = | — | Hit |
| 3 | 1 | 0 | ≠ | — | Miss |
| 4 | 0 | 1 | = | — | Hit |
| 5 | 0 | 1 | ≠ | — | Miss |
| 6 | 0 | 0 | = | <u>1</u> | Miss |
| 7 | 0 | 0 | = | <u>0</u> | Hit |
| 8 | 0 | 0 | ≠ | — | Miss |

("—" Indicates no relationship)

This table only shows items substantially identical to those shown in Table 2. Only two underscored items differ. In other words, the position indicated as SMMACC=1 is indicated as the "SMM region" in Table 2, while the position indicated as SMMACC=0 is indicated as the "Non-SMM region" in Table 2. This indicates the difference that, whereas the embodiment 1 determines the SMM region or the non-SMM region by the address decoder in the cache memory, this embodiment performs this in the memory controller, represents the result in the form of an SMMACC signal, and transfers it to the cache memory. Refer to the description in Table 2 for the detailed description of this table.

In view of such differences, this embodiment is characterized in that there is no address decoder in the cache memory. This enables the simplification of the structure of the cache memory. Therefore, this embodiment is effective when it is desired to provide a larger capacity of cache memory in the same space.

A third illustrative embodiment will now be described. These embodiments are provided with SMM flag bits for identifying the data source in each line of the cache tag memory. Such an addition of bits may, however, be undesirable in view of the restrictions on chip size and power consumption.

This embodiment discloses a method for preserving cache consistency without providing such a flag bit, and not using the cache memory for the access to the SMRAM. That is, when the CPU intends to access the SMRAM, access to the cache memory is ignored, and access is directly performed to the SMRAM.

Figure 6:
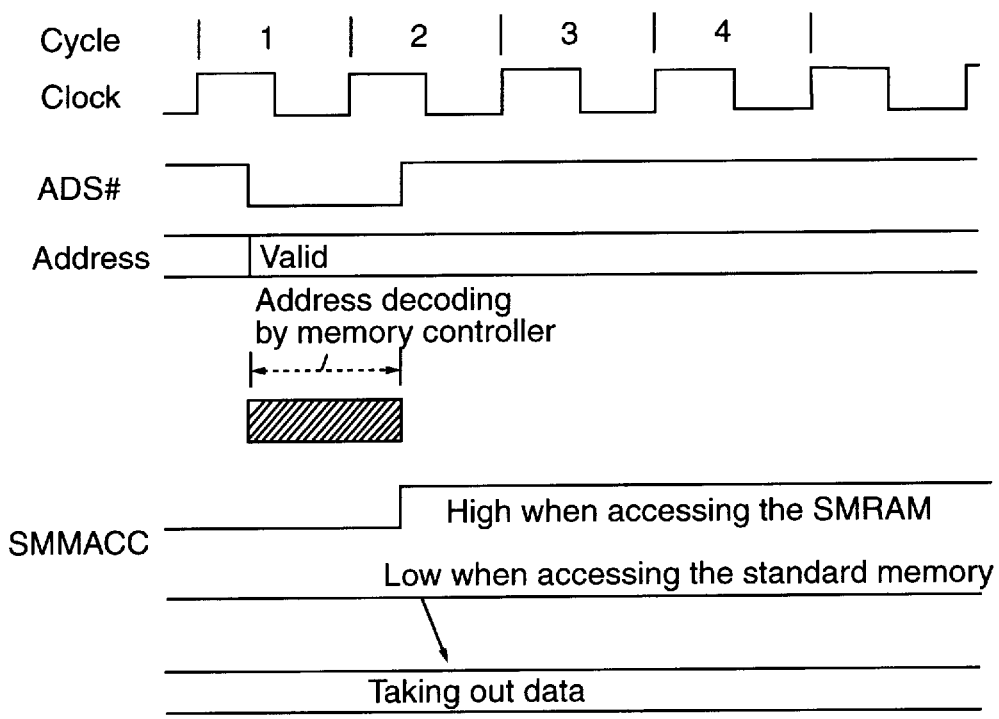
FIG. 6 is a timing diagram that includes the SMMACC signal.

This embodiment is illustrated in FIG. 6 as a timing chart. This chart indicates that, when SMIACT# is low, the memory controller decodes addresses, and issues an SMMACC signal to the cache memory. The CPU starts access in cycle. 1. In cycle 2, the memory controller directly decodes the CPU address, makes the SMMACC signal high when the access goes to the SMRAM, or makes the SMMACC signal low when it goes to the standard memory. If the SMMACC signal is high, on the one hand, the cache memory ignores the access attempt. On the other hand, if the SMMACC signal is low, the cache memory operates normally.

Thus, the cache memory monitors the SMMACC signal to determine whether data is sent to the CPU.

Although typical systems can accommodate the presented handshaking operation, there could be systems that do not satisfy the data setup time with respect to the rising edge of cycle 3 because of the address decoding or data driving delay. For these systems, it is possible to delay the decision on the operation mode until the end of cycle 2. That is, when the CPU is in the system management mode, the cache memory monitors the status of SMMACC signal at the end of cycle 2 to determine whether it will send data.

This fact implies that the cache memory cannot run with no wait. Therefore, the system management mode consumes more cycles than the standard mode. However, the added wait cycle places a very small penalty on the system performance because it appears only when the CPU is operating in the system management mode. The system throughput will be improved to at least a level higher than the cache flushing in the prior art.

In a computer system which operates in a plurality of modes, it is possible to operate the system without eliminating the use of the cache even if the physical memory to be accessed differs from operation mode to operation mode. Particularly, because cache flushing is not performed, it is possible to maintain the system throughput at substantially the same level as a system using only one mode.

One of the advantages of the invention described above is that the system can be operated while maintaining use of the cache, but without cache flushing. Thus, the throughput can be maintained at substantially the same level as a system using only one mode.

We claim:

1. A computer system having a standard mode and a system management mode ("SMM") of operation, said computer system also having an SMM signal indicative of the current operating mode of said computer, said computer system comprising:

a standard memory having a first address range;

an SMM memory having an SMM address range, said SMM address range overlapping a portion of said first address range, such that said first address range includes said SMM address range and a non-SMM address range;

a central processing unit ("CPU") having a CPU address signal;

a cache coupled to said CPU, said cache including a plurality of cache lines, each of said plurality of cache lines including an address field and an SMM flag bit, each of said address fields being indicative of an address of the data stored in the corresponding cache line, and each of said SMM flag bits indicating that the source of the data stored in the corresponding cache line is either from said standard memory or from said SMM memory;

an address comparator for comparing said CPU address signal to said address fields stored in said cache, said address comparator generating a first hit/miss signal, said first hit/miss signal being in a hit state when said CPU address is found in said cache, and said first hit/miss signal being in a miss state when said CPU address is not found in said cache;

an address decoder for determining if said CPU address is in said SMM address range or in said non-SMM address range;

control circuitry for generating a second hit/miss signal in response to said first hit/miss signal being in the hit state, said second hit/miss signal being in a miss state in response to:
  a) said computer system being in said standard mode and the SMM flag of the corresponding cache line indicating that the corresponding data came from said SMM memory, wherein the corresponding cache line is replaced by the corresponding data from said standard memory; or
  b) said computer system being in said SMM mode, the SMM flag of the corresponding cache line indicating that the corresponding data came from said standard memory, and said address decoder indicating that said CPU address is in the SMM address range, wherein the corresponding cache line is replaced by the corresponding data from the SMM memory; and said second hit/miss signal being in the hit state, wherein the data in the corresponding cache line is valid, in response to:
  a) said computer system being in said standard mode and the SMM flag of the corresponding cache line indicating that the corresponding data came from said standard memory; or
  b) said computer system being in said SMM mode, the SMM flag of the corresponding cache line indicating that the corresponding data came from said SMM memory; or
  c) said computer system being in said SMM mode, the SMM flag of the corresponding cache line indicating that the corresponding data came from said standard memory, and said address decoder indicating that said CPU address is in the non-SMM address range.

* * * * *